United States Patent Office 3,485,718
Patented Dec. 23, 1969

3,485,718
VIRUS PURIFICATION
Robert S. Baker, Indianapolis, Ind., assignor to Eli Lilly and Company, Indianapolis, Ind., a corporation of Indiana
No Drawing. Filed Sept. 27, 1967, Ser. No. 671,133
Int. Cl. C12k 7/00
U.S. Cl. 195—1.5                                    9 Claims

ABSTRACT OF THE DISCLOSURE

The present invention is directed to improved methods for separation and purification of myxoviruses. These improved methods comprise either separately or jointly (1) the use of an alkali metal or ammonium salts of oxalic or ethylenediaminetetraacetic acid in the barium sulfate adsorption of a myxovirus from allantoic fluid; and (2) the use of tris(hydroxymethyl)methylamine and/or certain ammonium salts in the sodium citrate elution of the myxovirus from the barium sulfate.

BACKGROUND OF THE INVENTION

To date, myxoviruses, e.g., influenza viruses, have generally been prepared by culturing a given virus strain in embryonated eggs, collecting the allantoic fluid therefrom, and thereafter separating the virus by centrifugation or passage through a column of a selectively adsorbent substance followed by inactivation. More recently, however, in an alternate method, a suspension of barium sulfate has been added to the allantoic fluid to selectively adsorb the virus, leaving behind the contaminants of the allantoic fluid in which the virus was cultured. However, for some virus strains even these methods are unsatisfactory in that as much as half or more of the virus is not extracted or recovered from the allantoic fluid. Moreover, the resulting vaccine is frequently contaminated with pyrogenic or other substances which cause undesirable side effects after immunization with the vaccine.

In addition, in the last few years sophisticated centrifugation devices have been designed and tested for separating the various particulate matters in liquid-solid suspensions. Such equipment has been and is being used to separate viruses from allantoic fluids in the hope of producing more pure, less pyrogenic vaccines therefrom. Unfortunately, passing raw, untreated allantoic fluid through these relatively new ultra-centrifuge machines to separate the virus from the allantoic fluid tends to clog the machine with large particulate matter, thus substantially lowering the efficiency of such machines.

OBJECTS

One object of this invention is to improve the quality of the virus-containing liquid that is to be further purified by zonal ultra-centrifugation methods.

A further object is to provide a more efficient method for extracting or adsorbing virus particles from allantoic fluid, generally, without regard to whether zonal centrifugation methods are subsequently used.

A separate object is to provide a more efficient method, in terms of amount of virus recovered, for eluting or removing virus from virus-laden adsorbants used to remove virus from allantoic fluids.

An additional object of this invention is to provide new virus-eluting compositions containing tris(hydroxymethyl)methylamine, ammonium chloride, or mixtures thereof to improve the virus extraction efficiency of such compositions.

A final object of this invention is to provide an improved virus extraction process which enables the recovery of more virus from a given volume of virus-containing allantoic fluid, and provides a cleaner virus-containing liquid medium for further concentration by known mechanical methods, e.g., by centrifugation procedures.

Typical prior art procedures for purification of influenza virus are disclosed e.g., in Nature, Vol. 198, Apr. 6, 1963, pages 109–110, and Nature, Vol. 205, Feb. 20, 1965, page 828, and in Journal of Immunology, Vol. 89, (1962), pages 794–804.

SUMMARY OF THE INVENTION

There have now been discovered improved methods for the separation and purification of myxoviruses, including influenza, rabies, mumps viruses and the like. These methods comprise, separately or jointly, (1) the use of an alkali metal or ammonium salts of oxalic acid and/or ethylenediaminetetraacetic acid in the barium sulfate adsorption of a myxovirus from an allantoic fluid; and (2) the use of tris(hydroxymethyl)methylamine or an ammonium halide, or an ammonium salt of an organic acid having from 1 to 6 carbon atoms in the sodium citrate elution of the myxovirus from the barium sulfate. In addition, an improved eluting solution containing sodium citrate, sodium chloride, and tris(hydroxymethyl)methylamine has been discovered.

It has been found that the use of either or both of these methods affords substantially higher yields of the desired virus for vaccine preparations; in addition, the resulting vaccine is obtained in significantly more pure form.

DETAILED DESCRIPTION OF THE INVENTION

In one aspect, the present invention is concerned with the use of an alkali metal or ammonium salts of oxalic or ethylenediaminetetraacetic acid (EDTA) in the barium sulfate adsorption of a myxovirus from an allantoic fluid. Thus, in this aspect, the present invention is directed to a method for the separation and purification of a myxovirus which method comprises the step of adsorbing the myxovirus from allantoic fluid onto barium sulfate, in the presence of an alkali metal or ammonium oxalate or EDTA salts.

This aspect of the invention, as the subsequent aspect, is applicable to myxoviruses, generally. The term "allantoic fluid" is used herein, as in the art generally, to designate that fluid found in fertilized embryonated eggs, but outside the embryonic cavity and outside the yolk sac as well. Generally, the allantoic fluid is that of fowl embryo, e.g., chicken, duck, and the like, and the culturing of the virus is generally conducted inside fowl eggs, the influenza virus being introduced via inoculation through the egg shell; but the precise identity and handling of the allantoic fluid with which the present invention is practiced is not critical.

In the instant improvement, there is supplied to the allantoic fluid containing the virus both barium sulfate and an alkali metal or ammonium oxalate or EDTA salt, which salts are soluble in the allantoic fluid. In the present specification and claims, the term "alkali metal" is employed to designate sodium, potassium, and lithium only. The supplying to the allantoic fluid of the barium sulfate and the alkali metal or ammonium oxalate or EDTA salt, hereafter simply designated the "oxalate," or "EDTA," need not be simultaneous. In general, it is convenient and preferred, to supply both at approximately the same time; but one can be supplied before the other. The manner of supplying to the allantoic broth is not critical. Mixtures of alkali metal or ammonium oxalate and EDTA salts may be used if desired, but mixtures are not required. Typically, the barium sulfate is simply added as a dry substance, preferably in a uniformly finely divided form to provide a barium sulfate concentration of from about 4 to about 7 percent (w./v.) in the allantoic fluid; barium sulfate having a uniform particle size of about 0.2 micron has been found to give good results. However, barium sulfate used in any prior art process may be used. It can be added as a suspension in a solvent miscible with the allantoic fluid; but such a step creates additional work and provides no advantage. The oxalate or EDTA salt, on the other hand, is effective in enhancing the virus adsorption onto the barium sulfate only insofar as it is soluble in the allantoic fluid, excess undissolved oxalate or EDTA being disadvantageous to the adsorption process. Therefore, it is preferred to add the oxalate or EDTA in solution in a solvent miscible with the allantoic fluid. Most preferably, the solvent is water. The concentration of oxalate or EDTA in the allantoic fluid is not critical; concentrations of from 0.01 M to 0.16 M of oxalate ion having been found to give the desired improvement while EDTA concentrations of from about 0.005 M to about 0.05 M give good results. Lower concentrations give only diminished improvement.

The concentration of the oxalate or EDTA in the solution thereof to be added to the allantoic fluid is not critical, it being possible to use concentrations as high as the solubility of the particular oxalate or EDTA in the particular solvent permits, provided only that the concentration of the oxalate or EDTA in the allantoic fluid is adequate, as desired above. In general, a more concentrated oxalate or EDTA solution is preferred in that it is adequate to treat a larger volume of allantoic fluid; and accordingly, the allantoic fluid is spared unnecessary dilution.

The temperatures under which the present adsorption process is carried out are not critical. In general, room temperatures are preferred, being convenient and there being no advantage to higher or lower temperatures. However, following the adsorption step of the present invention, lower temperatures are preferred for the process of separating the barium sulfate, with virus adsorbed thereon, from the allantoic fluid. For that separation purpose, temperatures of 0–5 C. are preferred. Separation can be achieved by mere decantation of the supernatant liquid from the barium sulfate with adsorbed virus; but generally, it is preferred to centrifuge the allantoic fluid to separate the virus-laden barium sulfate.

The advantages of the present invention are readily assessed by methods known in the prior art such as the method prescribed by the Division of Biologic Standards Division of the Department of Health, Education, and Welfare. This method is the Miller and Stanley modification of the Hirst densitometer method published in the Journal of Experimental Medicine, vol. 79, page 185, in 1944, and utilizes the chick red blood cell-agglutinizing ability of the virus as an essentially quantitative indicator of virus concentration, expressed as CCA per milliliter at liquid (CCA/ml.). In addition, the same phenomenon of virus agglutinization of chick red blood cell has been utilized in a modified form of the standardized test to provide a more rapid test of virus concentration. In this modified test, the lowest 1:2 serial dilution of virus, correlating to the concentration of virus, which agglutinizes chick red blood cells, is determined visually from a sample of the virus-containing fluid when serially diluted and mixed with a standard amount of chick red blood cells. The higher the dilution which causes the agglutination, the greater is the amount of virus in the original sample.

The adsorbant used is preferably an adsorbant grade barium sulfate, but it can be any adsorbant or adsorbant insoluble salt. The virus adsorbed on the barium sulfate or other adsorbant is not in a form suitable for immunization and must be recovered therefrom by a suitable eluting solution.

In the elution improvement aspect of this invention, it has been found that incorporating a small but effective amount of certain nitrogen compounds into the eluting solutions which have been used heretofor, the amount of virus recovered from the adsorbant is substantially increased.

The eluting solutions generally used in the prior art contain alkali metal citrate with or without sodium chloride. According to this invention the virus extracting efficiency of the eluting solutions is improved substantially by incorporating into the eluting solution a nitrogen compound selected from the group consisting of tris(hydroxymethyl)methylamine, a water soluble salt thereof, or water soluble ammonium salt which does not precipitate the virus from the eluting solution and which provides ammonium ion to the solution. Water soluble ammonium salts which can be used are the ammonium halide salts, e.g., ammonium chloride, ammonium bromide, ammonium iodide, and ammonium fluoride, as well as ammonium salts of water soluble organic acids having from 1 to 6 carbon atoms such as ammonium acetate, ammonium propionate, ammonium succinate, ammonium citrate, ammonium formate. Any concentration of the nitrogen compound which provides an improvement over the use of the alkali metal citrate and sodium chloride elution alone may be used. Typical concentrations of one or more of these nitrogen compounds in the eluting solutions generally range from total of about 0.1 to about 0.7 M. Mixtures of these nitrogen compounds can be used. Tris(hydroxymethyl)methylamine $$(HO-CH_2)_3-CH_2-NH_2$$

is the preferred nitrogen compound.

When processing some viruses by this invention, it has been found advantageous to include in the eluting solution a small amount, say, from about 0.1 to about 0.3 percent by weight of a gelatin, such as bone gelatin to stabilize the virus. In addition, with some viruses, small amounts, say, about 0.002 to about 0.02 percent by weight of a non-ionic surface active agent such as phenol-polyethylene oxide adducts, and long chain alcohol-ethylene oxide adducts containing from five to sixty ethylene oxide units therein further assist in the virus extraction.

The aqueous eluting solutions of this invention containing from about 0.1 to about 0.7 M tris(hydroxymethyl) methylamine, from about 0.5 to about 1.2 M sodium chloride and from about 0.15 to about 0.5 M sodium citrate, are particularly efficient eluting solutions and are believed to constitute new compositions of matter. These solutions may be used as such or may contain minor amounts of stabilizers such as gelatin and non-ionic surface active agent such as TWEEN 80 to enhance the virus extraction. These new eluting solutions are mixed with the virus-laden barium sulfate for from about 1 to about 5 hours at 20 to 40° C. Analysis of the eluate after removal from the barium sulfate uniformly shows increased virus concentration over the virus concentration obtained under similar conditions in the absence of at least one of these nitrogen compound ingredients.

The volume of the eluting solutions mixed with the virus-laden adsorbant depends somewhat on the concentration of the ingredients but generally may be any desired volume. Volumes of eluting solutions ranging from about 1/9 to about 1/5 the volume of the allantoic fluid from which the virus was extracted are preferred. Large volumes may be used but merely require the handling of unnecessary volumes of liquid.

The invention is further exemplified by the following detailed examples using various strains of influenza virus. However, it is to be understood that the same improved adsorption and elution procedures may be used to extract other myxoviruses from fluids in improved yields. Viruses which may be recovered by these methods include rabies, parainfluenza virus, mumps, measles, distemper, respiratory syncytial virus, Newcastle disease virus, and the like.

EXAMPLE 1

Eleven-day-old embryonated chick eggs were inoculated with 0.2 ml. of $A_2$/Taiwan/1–64 strain of influenza virus and incubated 48 hours at 34° C. The allantoic fluid from these chick eggs was collected and pooled. Thimerosol was added to give a thimerosol concentration of 0.005 percent.

To 235,000 ml. of the above virus containing allantoic fluid, having a CCA content of 128 CCA/ml., there was added 26,116 ml. of sterile 1.6 M potassium oxalate. The pH was adjusted to 7.7 to 8.1. While stirring this mixture, 13,056 gms. of J. T. Baker Co. adsorbant grade barium sulfate was added and the mixing was continued for 90 minutes at 20 to 23° C. The mixture was stored overnight at 1 to 5° C. The barium sulfate containing adsorbed virus particles was removed by centrifugation with a Sharples centrifuge operating at 7,000 revolutions per minute (r.p.m.) and a flow rate of 60–80 liters per hour.

The virus-holding barium sulfate was resuspended in 33,571 ml. of a virus eluting solution composed of 0.4 M tris(hydroxymethyl)methylamine
1.0 M sodium chloride
0.2 percent bone gelatin
0.25 M trisoduim citrate
0.016 percent "TWEEN 80" surfactant at pH 7.2. After stirring the mixture for about 2 hours at 37° C., thimerosol was added to give a final thimerosol concentration of 0.01 percent. The mixture was allowed to stand overnight at 20 to 25° C. The thus-eluted barium sulfate was removed from the mixture by centrifugation in an International Centrifuge (Size B, Model FS) at 1,500 r.p.m. for 10 minutes. The virus containing eluate was decanted, the pH thereof was adjusted to 7.9 to 8.1, and then 29,600 ml. of sterile pyrogen-free water was added to adjust the specific gravity of the virus containing eluate to 1.050±0.005.

This virus-containing eluate was then ready for further concentration and purification by known methods forming no part of this invention. This particular large batch of virus-containing eluate was further purified and concentrated by utilizing continuous flow zonal centrifugation in a K–II zonal centrifuge which has been described by N. G. Anderson et al. in ORNL–4024 "Semiannual Contract Progress Report to the National Institute of Allergy and Infectious Diseases," Mar. 1 to July 1, 1966, pages 18–20. While at rest the rotor of this centrifuge was filled with buffered sucrose solution having a specific gravity of 1.055 to 1.060 and then 1,800 ml. of this solution was displaced with buffered 60 percent sucrose solution to form a sucrose gradient by diffusion. The above prepared virus-containing eluate was passed through the rotor at a rate of 4 liters per hour with a rotor operating at 27,000 r.p.m. Buffered sucrose solution with a specific gravity of 1.040 to 1.045 was used to displace the last of the eluate through the rotor. (The aqueous sucrose solutions were buffered with 0.01 M disodium hydrogen orthrophosphate and also contained 0.15 M sodium chloride and 0.02 percent gelatin.)

After decelerating the rotor of the centrifuge to rest, the virus-containing liquid fractions were collected as indicated in Table 1 below. The percent sucrose was determined on each fraction in the region of the virus peak. The optical density of the concentrated virus sucrose medium at 280 m$\mu$, and the CCA units were determined on samples of each fraction. Selection of fractions for the virus pool were based on the ratio of CCA units to optical density and the total CCA content of the fractions. In this virus concentration run, the virus-containing eluate was processed as two centrifuge runs of 30 liters each.

Specific fractions, as determined by the total CCA tests, were pooled to give a virus-containing pool having a total volume of 528 ml.

An equal volume (528 ml.) of a sterile solution containing 0.2 percent gelatin in 0.15 M sodium chloride solution was added to the virus pool and thimerosal was added to provide a concentration of 0.01 percent. The pH of the diluted virus pool was adjusted to 7.2 to 7.4. After standing 18 to 24 hours, 1.06 ml. of formalin (37 percent formaldehyde in water solution) was added. The pH was checked and adjusted to keep the pH between 7.2 to 7.4 thirty minutes after the formalin addition, and at 24-, 48-, and 72-hour intervals. At the end of the 72 hours inactivation period, the resulting vaccine was diluted with 269 ml. of sterile 0.2 percent gelatin in 0.15 M sodium chloride to make a vaccine having virus concentration of approximately 5,000 CCA units per ml. Thimerosal was added to maintain its concentration in the vaccine at 0.01 percent. After standing overnight the formaldehyde-inactivated vaccine was filtered through sterile millipore membranes AP20, SC, and HA, each in a separate holder. Each filtering unit was pre-washed with two liters of sterile 0.15 M sodium chloride before filtering the vaccine. The total volume of vaccine was 1,525 ml. with a purity of 15,000 CCA per milligram of trichloracetic acid precipitated protein.

TABLE 1

Section A

| Fraction No. | Ml. | Percent Sucrose | CCA per ml. | OD1 cm. 280 | CCA/OD |
|---|---|---|---|---|---|
| 1–10 | 100 each | | | | |
| 11 | 50 | | | | |
| 12 | 50 | 51.2 | <820 | 3.05 | 134 |
| 13 | 25 | 50.4 | 410 | 3.25 | 126 |
| 14 | 25 | 20.1 | 420 | 3.59 | 117 |
| 15 | 25 | 49.6 | 430 | 3.55 | 121 |
| 16 | 25 | 49.4 | 620 | 3.73 | 166 |
| 17 | 25 | 48.8 | 820 | 3.90 | 210 |
| 18 | 25 | 48.3 | 1,650 | 4.20 | 393 |
| 19 | 25 | 48.1 | 820 | 4.65 | 176 |
| 20 | 25 | 47.7 | 1,280 | 4.70 | 272 |
| 21 | 25 | 47.2 | | | |
| 22 | 25 | 46.8 | Aliquot pool made of fractions 21–24 | | |
| 23 | 25 | 46.3 | 5,310 | 6.22 | 854 |
| 24 | 25 | 45.7 | | | |
| 25 | 25 | 45.4 | 18,490 | 9.58 | 1,930 |
| 26 | 25 | 45.1 | 27,090 | 12.50 | 2,167 |
| 27 | 25 | 44.6 | 32,960 | 14.50 | 2,273 |
| 28 | 25 | 43.8 | 32,960 | 14.70 | 2,242 |
| 29 | 25 | 43.5 | 24,770 | 13.50 | 1,835 |
| 30 | 25 | 42.9 | 19,360 | 13.00 | 1,489 |
| 31 | 25 | 42.3 | 16,480 | 12.00 | 1,375 |
| 32 | 25 | 41.7 | 11,020 | 10.50 | 1,050 |
| 33 | 50 | 39.5 | 5,590 | 7.15 | 782 |
| 34 | 50 | | | | |
| 35–54 | 100 each | | | | |

Section B

| Fraction No. | Ml. | Percent Sucrose | CCA per ml. | OD1 cm. 280 | CCA/OD |
|---|---|---|---|---|---|
| 1–10 | 100 each | | | | |
| 11 | 50 | | | | |
| 12 | 50 | 49.8 | 820 | 3.10 | |
| 13 | 25 | 49.3 | 820 | 2.55 | |
| 14 | 25 | 48.9 | 820 | 3.55 | |
| 15 | 25 | 48.6 | 820 | 3.85 | |
| 16 | 25 | 48.2 | 820 | 4.10 | |
| 17 | 25 | 47.8 | 820 | 4.38 | |
| 18 | 25 | 47.4 | 1,190 | 4.70 | 253 |
| 19 | 25 | 46.9 | 1,930 | 5.10 | 378 |
| 20 | 25 | 46.1 | 3,170 | 5.38 | 589 |
| 21 | 25 | 45.5 | | | |
| 22 | 25 | 45.3 | Aliquot pool made of fractions 21–24 | | |
| 23 | 25 | 45.1 | 18,030 | 12.5 | 1,442 |
| 24 | 25 | 44.5 | | | |
| 25 | 25 | 43.8 | 20,810 | 13.5 | 1,541 |
| 26 | 25 | 43.4 | 21,060 | 12.5 | 1,685 |
| 27 | 25 | 43.0 | 12,670 | 12.0 | 1,056 |
| 28 | 25 | 42.6 | 11,180 | 10.9 | 1,025 |
| 29 | 25 | 42.0 | 8,240 | 8.5 | 969 |
| 30 | 25 | 41.5 | 7,470 | 8.1 | 927 |
| 31 | 25 | 40.8 | 5,920 | 7.3 | 811 |
| 32 | 25 | 40.4 | 5,040 | 7.15 | 705 |
| 33 | 50 | 39.2 | 3,010 | 6.35 | 569 |
| 34 | 50 | | | | |
| 35–54 | 100 each | | | | |

OD1 cm. 280—Optical density at 280 m$\mu$ in a 1 cubic centimeter cell compared to standard buffered gelatin diluting solution.

In addition to the $A_2$/Taiwan/1–64 strain, influenza virus strains B/Massachusetts/3–66 and $A_1$/Ann Arbor/1–57 were processed by this method. Other influenza virus strains were processed with the following modifications.

(1) $A_2$/Japan/170–62 strain was eluted from the barium sulfate with the eluting solution adjusted to pH 8.8 and the TWEEN 80 concentration reduced to 0.002 percent.

(2) B/Maryland/1–59 strains was adsorbed from the allantoic fluid with the barium sulfate concentration increased to 6 gms. per 100 ml. of allantoic fluid and was eluted from the barium sulfate with the TWEEN 80 omitted from the eluting solution.

Overall yields of vaccine processed by the adsorption, elution, and ultra-centrifugation procedure described above have ranged from 10 percent to about 65 percent. The purity of these vaccines range from 5 to 10 fold higher than those prepared by commercial processes of the prior art. Animal tests and preliminary trials in humans indicate that the thus purified vaccines are immunologically potent and substantially free of materials causing systemic reactions.

Other batches of influenza virus purified from the allantoic fluids by the adsorption and elution procedure of this invention have been further concentrated by centrifuging the virus-containing eluate in a Beckman Instrument Co. L-4 centrifuge with a B–IX type rotor, and in a Beckman Instrument Co. Model ZU zonal ultracentrifuge, which was commercially available.

EXAMPLE 2

This example illustrates the improved virus adsorption efficiencies obtainable by this invention in comparison with the use of barium sulfate alone.

A batch of pooled chick allantoic fluid containing Taiwan strain of influenza virus was treated (a) barium sulfate alone, (b) barium sulfate in the presence of potassium oxalate, (c) EDTA. The percent of original virus in the allantoic fluid which was absorbed by the barium sulfate in the two methods was determined by the CCA/ml. method. In each case, 60 mg. of adsorbant grade barium sulfate was added to 100 ml. of the virus-containing allantoic fluid, either as the only treating agent or in the presence of 0.16 M of potassium oxalate and stirred at 37° C. for 20 minutes. The results were as follows:

Treatment: Percent virus adsorbed
  $BaSO_4$ alone _____ 0
  $BaSO_4$ in presence of 0.16 M $K_2C_2O_4$ _____ 75
  $BaSO_4$ in presence of 0.005 EDTA _____ 87

Similar tests were conducted with Ann Arbor strain of influenza virus-containing chick allantoic fluid. The results were as follows:

Treatment: Percent virus adsorbed
  $BaSO_4$ alone _____ 0
  $BaSO_4$ in presence of 0.16 M $K_2C_2O_4$ _____ 75
  $BaSO_4$ in presence of 0.005 M EDTA _____ 75

Similar tests were conducted with Maryland B strain of influenza virus-containing allantoic fluid. The results were as follows:

Treatment: Percent virus adsorbed
  $BaSO_4$ alone _____ 50
  $BaSO_4$ in presence of 0.16 M $K_2C_2O_4$ _____ 97
  $BaSO_4$ in presence of 0.05 M EDTA _____ 87

Also, improved virus adsorption efficiencies have been obtained by barium sulfate adsorption of virus from allantoic fluids containing alkali metal oxalic acid salts with Massachusetts strain of influenza virus.

EXAMPLE 3

This example illustrates the improved elution efficiency obtainable by the use of the eluting solutions of this invention.

Eleven 100 ml. samples of Japan 170 strain of influenza virus-containing allantoic fluid, prepared as described in Example 1, were each treated with 11 ml. of 1.6 M potassium oxalate and 40 g. of J. T. Baker Co. adsorbant grade barium sulfate at pH 7.6 to adsorb the virus from the fluid. The average Hemaglutination (HA) titer potench of the supernatant fluid containing unabsorbed virus was 1:8. The original virus (OV) HA titer in the allantoic fluid was 1:2048. Thus, almost all (99.9 percent) of the virus was extracted from the allantoic fluid by this adsorption procedure.

The eleven virus-containing barium sulfate adsorbed samples were then separated from their respective allantoic fluid masses, and these adsorbed samples were then treated with one of the following eluting solutions to determine the relative efficiency of the solution for removing virus from the barium sulfate.

| Sample | Eluting Solution | pH | Reciprocal of HA Titer | Percent Eluted |
|---|---|---|---|---|
| OV | None | 7.6 | 16,384 | ¹ 100 |
| 1 | 0.25 M trisodium citrate | 8.0 | 1,024 | 6.25 |
| 2 | 0.5 M trisodium citrate | 8.0 | 512 | 3.12 |
| 3 | 1.0 M trisodium citrate | 8.0 | 4 | 0 |
| 4 | 0.25 M trisodium citrate | 7.2 | 1,024 | 6.25 |
| 5 | 0.25 M trisodium citrate | 8.8 | 1,024 | 6.25 |
| 6 | 5 percent $Na_2SO_4$ | 8.0 | 128 | 0.78 |
| 7 | 0.5 M tetrasodium ethylenediamine tetraactate | 7.8 | 16 | 0 |
| 8 | Solution No. 1 | 7.2 | 4,096 | 25 |
| 9 | Solution No. 2 | 7.2 | 4,096 | 25 |
| 10 | Solution No. 3 | 7.2 | 4,096 | 25 |
| 11 | Solution No. 4 | 7.2 | 8,192 | 50 |

¹ Theory.

Solution No. 1 contained:
  0.2 percent bone gelatin
  0.25 M trisodium citrate
  0.04 M tris(hydroxymethyl)methylamine hydrochloride
  1.0 M sodium chloride
  0.016 percent "TWEEN 80"
  Adjusted to pH 7.2

Solution No. 2 contained:
  0.25 M trisodium citrate
  0.40 M tris(hydroxymethyl)methylamine hydrochloride
  0.2 percent bone gelatin
  Adjusted to pH 7.2

Solution No. 3 contained:
  0.25 M trisodium citrate
  0.40 M tris(hydroxymethyl)methylamine hydrochloride
  1 M sodium chloride
  0.2 percent bone gelatin
  Adjusted to pH 7.2

Solution No. 4 contained:
  0.25 M trisodium citrate
  0.40 M tris(hydroxymethyl)methylamine hydrochloride
  0.002 percent "TWEEN 80"
  0.2 percent bone gelatin
  Adjusted to pH 7.2

It can be seen from these data that an eluting solution containing tris(hydroxymethyl)methylamine as well as the sodium citrate is substantially more efficient than sodium citrate solutions alone in extracting the virus from the barium sulfate.

EXAMPLE 4

A batch of crude allantoic fluid of about 5.5 liter volume containing Massachusetts B strain of influenza virus was treated with 1/9 its volume of 1.6 M potassium oxalate solution, and with thimerosal to a concentration of 1:20,000. The pH was adjusted to 8.0. The supernatant was decanted from the debris in the bottom of the container and a 50 ml. sample was taken for virus potency determination measured in CCA units. The CCA ml. on this sample (labeled OV) was 128 CCA/ml. The oxalate salt treated allantoic fluid was divided into 11 portions of about 450 ml. Each portion was treated with about 22.5 grams (about 5 percent w./v.) of J. T. Baker Company adsorbant grade barium sulfate, stirred at room temperature for 90 minutes, and stored at 0.5° C. overnight. The contents of each portion was then centrifuged at 2,500 r.p.m. for 10 minutes, and then the supernatant liquid was poured off the virus-containing barium sulfate. The supernatant liquid contained less than 7 CCA/ml. of virus.

The virus-containing barium sulfate portions were then mixed with one of the following eluting solutions by stirring the mixture for 2 hours at 37°, and then allowing the mixture to stand overnight. The mixture was centrifuged at 2,500 r.p.m. for 10 minutes. The eluate supernatant containing the virus was poured off. Ten ml. samples of the supernatants were taken to determine the virus potency in CCA/ml. units.

| Elutency Solution | pH | Components and Concentrations | | | | | | CCA/ ml. |
|---|---|---|---|---|---|---|---|---|
| | | Tris,[2] M | NaCl, M | Gel.[3] | Cit.,[4] M | NH₄Cl, M | Vol.[5] | |
| OV[1] | (*) | | | | | | | 128 |
| 1 | 7.2 | .4 | 1.0 | 0.2% | 0.25 | | ½ | 840 |
| 2 | 7.2 | .4 | 1.0 | 0.2% | 0.25 | | ½ | 605 |
| 3 | 8.8 | .4 | 1.0 | 0.2% | 0.25 | | ½ | 696 |
| 4 | 7.2 | | 1.0 | 0.2% | 0.25 | 0.4 | ½ | 616 |
| 5 | 7.2 | | 1.0 | 0.2% | 0.25 | 0.4 | ½ | 602 |
| 6 | 8.8 | | 1.0 | 0.2% | 0.25 | 0.4 | ½ | 634 |
| 7 | 7.2 | | 1.0 | 0.2% | | 0.4 | ½ | 503 |
| 8 | 7.2 | | | | 0.25 | | ½ | 229 |
| 9 | 7.2 | | 0.15 | 0.2% | | 0.4 | ½ | 18 |
| 10 | 8.8 | | 0.15 | 0.2% | | 0.4 | ½ | 18 |
| 11 | 7.2 | | | | 0.25 | 0.4 | ½ | 320 |

[1] OV denotes the original virus concentration in the allantoic fluid before adsorption and elution.
[2] Tris refers to tris(hydroxymethyl)methylamine.
[3] Gel. refers to the gelatin in the solution.
[4] Cit. refers to trisodium citrate.
[5] Vol. is the volume fraction of elution solution relative to the volume of the original allantoic fluid portion.,
*Control.

These data show the improved efficiency of virus extraction (in terms of improved CCA/ml. units) by use of the combined adsorption and elution procedures of this invention.

EXAMPLE 5

A 5.5 liter batch of chick allantoic fluid containing TAIWAN strain of influenza virus was treated with 1/9 its volume of 1.6 M potassium oxalate solution and thimerosal to a concentration of 1:20,000. The pH was adjusted to 8.0 with concentrated hydrochloric acid. The fluid was decanted from the debris in the bottom of the container and a sample of the supernatant was taken for virus concentration determination.

The allantoic fluid as treated above was divided into 11 equal parts of about 450 ml. each. Barium sulfate, 22.5 g., was added to each portion of oxalate treated allantoic fluid to provide a w./v. concentration of about 5 percent. The mixtures were stirred at room temperature for 90 minutes and then stored at 0-5° C. overnight. The mixtures were then centrifugated at 2,500 r.p.m. for 10 minutes to separate the virus-holding barium sulfate. The supernatant fluid was poured off. The CCA/ml. virus concentration in the supernatant was less than 6. The barium sulfate with the adsorbed virus was treated with one of the following elution solutions by stirring the mixture of the virus-holding barium sulfate and the elution solution for 2 hours at 37° C., and then allowing the mixture to stand at room temperature overnight. The solution mixture was centrifuged at 2,500 r.p.m. for 10 minutes to separate the barium sulfate. Ten (10) ml. samples of the supernatant virus-containing eluates were taken for virus concentration determinations. The aqueous elution solutions and the results obtained are summarized in the table below:

| Eluting Solution | pH | Components and Concentrations | | | | | | CCA/ ml. |
|---|---|---|---|---|---|---|---|---|
| | | Tris, M | NaCl, M | Gel. | Cit., M | NH₄Cl, M | Vol. | |
| None | | (OV—Allantoic fluid) | | | | | | 66 |
| None | | Supernatant after virus adsorption | | | | | | 6 |
| 1 | 7.2 | 0.4 | 1.0 | 0.2% | 0.25 | | ½ | 363 |
| 2 | 7.2 | 0.4 | 1.0 | 0.2% | 0.25 | | ½ | 313 |
| 3 | 8.8 | 0.4 | 1.0 | 0.2% | 0.25 | | ½ | 329 |
| 4 | 7.2 | | 1.0 | 0.2% | 0.25 | 0.4 | ½ | 334 |
| 5 | 7.2 | | 1.0 | 0.2% | 0.25 | 0.1 | ½ | 326 |
| 6 | 8.8 | | 1.0 | 0.2% | 0.25 | 0.4 | ½ | 246 |
| 7 | 7.2 | | 1.0 | 0.2% | | 0.4 | ½ | 217 |
| 8 | 7.2 | | | | 0.25 | | ½ | 244 |
| 9 | 7.2 | | .15 | 0.2% | | 0.4 | ½ | 56 |
| 10 | 8.8 | | .15 | 0.2% | | 0.4 | ½ | 56 |
| 11 | 7.2 | | | | 0.25 | 0.4 | ½ | 263 |

These data show the improved efficiency of virus extraction (in terms of improved CCA/ml. units) by use of the combined adsorption and elution procedures of this invention.

What I claim is:

1. In a method for extracting myxovirus from allantoic fluids in which the virus-containing allantoic fluid has been contacted with barium sulfate adsorbant, the improvement which consists of the step of effecting said contact in the presence of a dissolved alkali metal or ammonium salt of oxalic acid.

2. A method as described in claim 1 wherein the salt is an alkali metal salt of oxalic acid.

3. A method as described in claim 2 wherein the alkali metal salt of oxalic acid is potassium oxalate.

4. A method for removing myxovirus from a barium sulfate adsorbant which comprises contacting the virus-laden barium sulfate with an aqueous eluting solution of sodium citrate and sodium chloride, and containing in addition a nitrogen compound selected from the group consisting of tris(hydroxymethyl)methylamine, a water soluble salt thereof, ammonium halides, and ammonium salts of organic acids having from 1 to 6 carbon atoms.

5. An elution method as described in claim 4 wherein the nitrogen compound is tris(hydroxymethyl)methylamine or a water soluble salt thereof.

6. An elution method as described in claim 4 wherein the nitrogen compound is an ammonium halide salt.

7. An elution method as described in claim 5 wherein the eluting solution contains the following concentrations: from about 0.1 M to 0.7 M tris(hydroxymethyl)-methylamine, from 0.5 to 1.2 M sodium chloride, from 0.15 to 0.5 M sodium citrate.

8. A method for separating myxovirus proteinaceous materials from non-viral particulate matter in allantoic fluids in which the virus is grown which comprises (1) mixing the virus-containing allantoic fluid with an alkali metal or ammonium salt of oxalic or ethylenediaminetetraacetic acids (EDTA), (2) mixing adsorbant barium sulfate with the allantoic fluid in the presence of the oxalate or EDTA salt to take up the virus on the barium sulfate from the allantoic fluid, (3) separating the virus-laden barium sulfate from the virus-depleted allantoic fluid, (4) and eluting the virus from the virus-laden barium sulfate by mixing the virus-laden barium sulfate with an aqueous solution of sodium citrate and sodium chloride, containing a small but effective amount of a nitrogen compound selected from the group consisting of tris(hydroxymethyl)methylamine, ammonium halides, and ammonium salts of organic acids having from 1 to 6 carbon atoms, and (5) separating the virus-depleted barium sulfate from the virus-containing eluate.

9. A method as described in claim 8 wherein (1) the oxalate salt is an alkali metal oxalate, (2) the barium sulfate is mixed with the allantoic fluid in a concentration of from about 4 to about 7 percent on weight/volume basis, and in step (4) the nitrogen compound is tris-(hydroxymethyl)methylamine.

References Cited

Drescher, J. et al., J. Immunol. 89: 794–814 December 1962, "Photometric Methods for the Measurement of Hemagglutinating Viruses and Antibody."

Mizutani, H., Nature 198 (4875): 109–110 Apr. 6, 1963, "A Simple Method for Purification of Influenza Virus."

Klembala, M. et al., Nature 205 (4973): 828 Feb. 20, 1965, "Further Simplification of the Purification Procedure of Influenza Virus on Barium Sulphate."

Reimer, C. B. et al., Science 152: 1379–1381 June 3, 1966, "Influenza Virus Purification With the Zonal Centrifuge."

Reimer, C. B., J. Bact. 92(4): 1271–1272 October 1966, "Comparison of Techniques for Influenza Virus Purification."

S. K. ROSE, Primary Examiner